(12) United States Patent
Wlassics et al.

(10) Patent No.: US 9,828,444 B2
(45) Date of Patent: Nov. 28, 2017

(54) FLUORINATED CHITOSAN DERIVATIVES

(71) Applicant: SOLVAY SPECIALTY POLYMERS ITALY S.P.A., Bollate (IT)

(72) Inventors: Ivan Wlassics, Garessio (IT); Claudio Adolfo Pietro Tonelli, Paderno D' Adda (IT); Giuseppe Marchionni, Milan (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 14/652,093

(22) PCT Filed: Dec. 4, 2013

(86) PCT No.: PCT/EP2013/075473
§ 371 (c)(1),
(2) Date: Jun. 12, 2015

(87) PCT Pub. No.: WO2014/090648
PCT Pub. Date: Jun. 19, 2014

(65) Prior Publication Data
US 2015/0337055 A1 Nov. 26, 2015

(30) Foreign Application Priority Data
Dec. 12, 2012 (EP) .................... 12196744

(51) Int. Cl.
*C08L 5/08* (2006.01)
*C08B 37/00* (2006.01)
*D01F 9/00* (2006.01)
*C08B 37/08* (2006.01)
*C09D 105/08* (2006.01)

(52) U.S. Cl.
CPC ........ *C08B 37/0027* (2013.01); *C08B 37/003* (2013.01); *C09D 105/08* (2013.01); *D01F 9/00* (2013.01)

(58) Field of Classification Search
CPC . C08B 37/0027; C08B 37/003; C09D 105/08; D01F 9/00
See application file for complete search history.

(56) References Cited

U.S. PATENT DOCUMENTS

| 6,264,929 | B1 | 7/2001 | Karlen et al. |
| 2003/0199687 | A1 | 10/2003 | Yalpani |
| 2007/0112183 | A1 | 5/2007 | Kitano et al. |
| 2015/0018433 | A1* | 1/2015 | Leipzig .................. A61L 15/28 514/777 |

FOREIGN PATENT DOCUMENTS

| FR | 2640627 | A1 | 6/1990 |
| JP | 58092449 | A | 6/1983 |
| JP | 2002138101 | A | 5/2002 |
| RU | 2036135 | C1 | 5/1995 |
| RU | 2048471 | C1 | 11/1995 |
| WO | 2008141452 | A1 | 11/2008 |

OTHER PUBLICATIONS

Defaye, J. et al., "A convenient access to β-(1-4)-linked 2-amino-2-deoxy-D-glucopyranosyl fluoride oligosaccharides and β-(1-4)-linked 2-amino-2-deoxy-D-glucopyranosyl oligosaccharides by fluorination-hydrolysis of chitosan", Carbohydrate Research, 1994, vol. 261, No. 2, pp. 267-277—Elsevier BV.

Popova, O. V. et al., "Electrochemical fluorination of lignins", Zhurnal Prikladnoi Khimii (Sankt-Peterburg), 1995, vol. 68, No. 7, pp. 1137-1142.

Kovalenko, E. I. et al., "Electrochemical synthesis of polyfunctional lignins", Russian Journal of Electrochemistry, 1996, vol. 32, No. 1, pp. 72-76.

Zhang, Y. X. et al., "Fluorocarbon modified chitin and chitosan I. Synthesis and characterization of perfluorocarbonyl chitin", Macromolecular Sympsoa, 1999, vol. 144, Issue 1, pp. 423-426—Wiley-VCH GmbH.

Chun-Ho Kim. et al., "Preparation of Trifluoroacetyl Chitosan Derivatives with Antiviral Activity", J. Korean Ind. Eng. Chem., 1999, vol. 10, No. 4, pp. 599-602.

Kovalenko, E. I. et al., "Electrochemical modification of lignins", Russian Journal of Electrochemistry, 2000, vol. 36, No. 7, pp. 706-711.

Chow, K. S. et al., "New fluorinated chitin derivatives: synthesis, characterization and cytotoxicity assessment", Carbohydrate Polymers, 2002, vol. 47, No. 4, pp. 357-363—Elsevier Ltd.

Son, T. et al, "Study on Electrorheological Fluid of the Synthesized Chitosan Derivatives", J. Chitin Chitosan, 2004, vol. 9, No. 4, pp. 175-179.

Ohomae, M. et al, "Enzymatic synthesis of an alternatingly 6-fluorinated chitin derivative catalyzed by chitinase", Transactions of the Materials Research Society of Japan, 2004, vol. 29, No. 1, pp. 27-30.

Makino, A. et al, "Synthesis of fluorinated chitin derivatives via enzymic polymerization", Macromolecular Bioscience, 2006, vol. 6, No. 10, pp. 862-872—Wiley-VCH GmbH.

* cited by examiner

*Primary Examiner* — Alexander Polyansky

(57) ABSTRACT

A poly-[1-4]-D-glucosamine derivative comprising [1-4]-D-glucosamine recurring units and comprising a fluoropolyether chain bound to the nitrogen atom in the C-2 position of at least one of the [1-4]-D-glucosamine recurring units.

20 Claims, No Drawings

FLUORINATED CHITOSAN DERIVATIVES

This application is a U.S. national stage entry under 35 U.S.C. §371 of International Application No. PCT/EP2013/075473 filed Dec. 4, 2013, which claims priority to European application No. 12196744.2 filed on Dec. 12, 2012. The entire contents of these applications are explicitly incorporated herein by this reference.

TECHNICAL FIELD

The present invention relates to polysaccharide derivatives modified with fluoropolyether chains, their method of manufacture and their use.

BACKGROUND ART

Chitosan is the commonly used name for poly-[1-4]-β-D-glucosamine. Chitosan is commercially available and is chemically derived from chitin, which is a poly-[1-4]-β-N-acetyl-D-glucosamine. Chitin is the second most abundant polysaccharide after cellulose and is found widely in nature, for instance in the cell walls of fungi, the exoskeletons of insects and, in particular, the exoskeletons of crustaceans.

Chitosan is produced by deacetylation of chitin. The degree of deacetylation may vary but generally is at least 60%. Commercially available chitosans have a degree of deacetylation of from 60 to 100%, typically of from 75 to 95%.

Within the scope of the present specification the terms "chitosan" and "poly-[1-4]-β-D-glucosamine" may be used interchangeably to denote a poly-[1-4]-β-D-glucosamine having a degree of deacetylation of at least 60%. Totally deacetylated chitosan contains recurring units of formula (I):

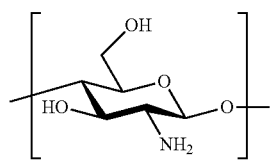

(I)

According to common practice the carbon atom bearing the amino $—NH_2$ group is indicated as the "C-2 position", whereas the primary carbon atom of the $—CH_2OH$ group in formula (I) as the "C-6 position". The bond between adjacent recurring units involves the carbon atoms in the C-1 and the C-4 positions as indicated by the notation [1-4]. Depending on the orientation of the $—OH$ group in the C-1 position (axial or equatorial) the glucosamine unit is defined as α-D-glucosamine or β-D-glucosamine. For the sake of simplicity in formula (I) and in the subsequent formulas the units will be drawn as β-D-glucosamine units although the invention encompasses both configurations.

Chitosan is frequently employed as bioactive, biocompatible and biodegradable material in medical and pharmaceutical applications. Additionally, chitosan forms films and fibers provided with high tensile strength. Chitosan films and coatings are also provided with remarkable barrier properties against the permeation of chemical and biological agents while at the same time maintaining permeability to water vapour.

The great current interest in chitosan and some of its derivatives is readily understood.

Only a few fluorine-containing derivatives of chitosan have been previously disclosed.

FR 2640627 (COMMISARIAT A L'ENERGIE ATOMIQUE) 22 Jun. 1990 discloses the reaction of chitosan or polygalactosamine with anhydrous HF to yield oligosaccharides or monosaccharides wherein the $—NH_2$ groups in the C-2 position are in the $—NH_3(^+)F(^-)$ form and the terminal gluco- or galactopyranosyle units have a C—F bond in the C-1 position.

U.S. Pat. No. 6,264,929 (WELLA AKTIENGESELLSHAFT) 24 Jul. 2001 discloses compositions for the treatment of hair which comprise the product obtained by the neutralization of a polymer having basic groups (e.g. chitosan) with a fluorinated acid of formula: $A-(CH_2)_x—(CF_2)_y—(CH_2)_z—B$ wherein x and z may independently be a number from 0 to 5, y is a number from 1 to 21, A is an acid group and B is either a fluorine atom (then z=0) or an acid group.

WO 2008/141452 (RIVAL S.E.C.) 27 Nov. 2008 discloses a process for the preparation of an organosoluble chitosan salt which comprises reacting chitosan with a fluoroalkyl carboxylic acid or a fluoroalkyl sulfonic acid having at least 3 fluorine atoms. Notable examples of suitable acids are trifluoroacetic or trifluoromethanesulfonic acids. The soluble chitosan salts can be used as intermediates for further transformation of the chitosan backbone. Examples are the silylation of the $—OH$ group on the C-6 position using t-butyldiphenylsilyl trifluoroacetate.

US 20030199687 (MANSSUR YALPANI) 23 Oct. 2003 discloses fluorinated biopolymers useful as imaging probes, diagnostic methods and contrast agents. Biopolymers comprising [1-4]-D-glucosamine recurring units are disclosed, however polymers comprising [1-4]-D-glucosamine units having $—NH(fluoropolyether)$ side chains in the C-2 position are not explicitly described. The preparation of said compounds is also not disclosed.

It has now been found that chitosan derivatives containing fluoropolyether chains bound to the nitrogen atom in the C-2 position can be prepared and are provided with unique properties which render them useful in a number of applications.

DESCRIPTION OF INVENTION

Object of the present invention is a poly-[1-4]-D-glucosamine derivative, hereinafter referred to as "glucosamine derivative [A]", comprising D-glucosamine recurring units and comprising a fluoropolyether chain bound to the nitrogen atom in the C-2 position of at least one of the D-glucosamine recurring units. In a preferred aspect the glucosamine recurring units are β-D-glucosamine units.

Glucosamine derivative [A] is characterised by the fact that it comprises recurring units of formula (Ia):

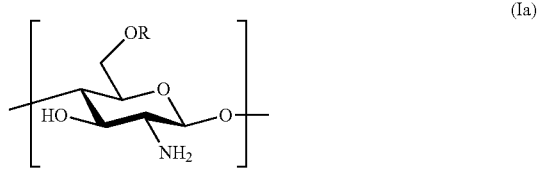

(Ia)

wherein R is $—H$ or a $C_1$-$C_{20}$ alkyl group, optionally comprising cyclic or aromatic moieties, optionally comprising heteroatoms in the alkyl chain, and/or optionally comprising functional groups; preferably R is $—H$;

and at least 0.1 mol % and at most 25 mol % of recurring units of formula (II):

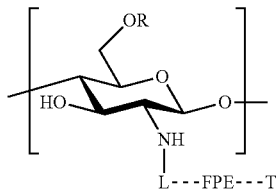

(II)

wherein the term FPE indicates a fluoropolyether chain; R is as defined in formula (Ia); L indicates a linking group between the fluoropolyether chain and the nitrogen atom in the C-2 position in the D-glucosamine unit and T indicates a terminal group.

For the purposes of the present invention, the terms "fluoropolyether chain" and "FPE", identify a polymer chain comprising a fully or partially fluorinated polyoxylakylene chain, which comprises, preferably consists of, recurring units having at least one catenary ether bond and at least one fluorocarbon moiety. Typically, the fluoropolyether chain comprises one or more randomly distributed recurring units selected from the group consisting of:
(i) —CFXO—, wherein X is —F or —CF$_3$;
(ii) —CF$_2$CFXO—, wherein X is —F or —CF$_3$;
(iii) —CF$_2$CF$_2$CF$_2$O—;
(iv) —CF$_2$CF$_2$CF$_2$CF$_2$O—;
(vi) —(CF$_2$)$_k$—CFZ—O—, wherein k is an integer from 0 to 3 and Z is a group of general formula —OR$_F$T$_1$, wherein R$_F$ is a fluoropolyoxyalkylene chain comprising a number of recurring units from 0 to 10, said recurring units being chosen among the following: —CFXO—, —CF$_2$CFXO—, —CF$_2$CF$_2$CF$_2$O—, —CF$_2$CF$_2$CF$_2$CF$_2$O—, with each of X being independently —F or —CF$_3$, and T$_1$ is a C$_1$-C$_5$ perfluoroalkyl group, and mixtures thereof.

Notable examples of fluoropolyether chains for the poly-[1-4]-D-glucosamine derivative of the invention are those comprising units selected from the group consisting of:
—(CF$_2$O)$_a$—(CF$_2$CF$_2$O)$_b$—(CF$_2$—(CF$_2$)$_d$—CF$_2$O)$_c$,
wherein a, b and c are integers up to 100, preferably up to 50, and d is independently at each occurrence an integer equal to 1 or 2, a≥0, b≥0, c≥0 and a+b>0; preferably, each of a and b are >0 and b/a is comprised between 0.1 and 10;
—(C$_3$F$_6$O)$_e$—(CF$_2$CF$_2$O)$_b$—(CFXO)$_g$—, wherein X is, at each occurrence, independently selected among —F and —CF$_3$; b, e and g are integers up to 100, e>0, b≥0, g≥0; preferably, b and g>0, e/b is comprised between 0.2 and 5.0 and (e+b)/g is comprised between 5 and 50;
—(C$_3$F$_6$O)$_e$—(CFXO)$_g$—, wherein X is, at each occurrence, independently selected among —F and —CF$_3$; e and g are integers up to 100, e>0, g≥0, preferably g>0, e/g being comprised between 5 and 50.

Preferably, the recurring units are selected from —CF$_2$O— and —CF$_2$CF$_2$O— units. More preferably the recurring units are —CF$_2$O— and —CF$_2$CF$_2$O— units and their molar ratio b/a in the polymer chain ranges preferably from 0.1 to 10, more preferably from 0.5 to 5.

The fluoropolyether chain may have a number average molecular weight (M$_n$) of at least 200 g/mol, preferably of at least 300 g/mol, more preferably at least 500 g/mol. The molecular weight (M$_n$) typically does not exceed 15,000 g/mol, preferably it does not exceed 10,000 g/mol. The fluoropolyether chain typically has a number average molecular weight (M$_n$) of at least 1,000 g/mol and of at most 4,000 g/mol.

Each fluoropolyether chain is bound to the nitrogen atom in the C-2 position via a linking group L. The nature of linking group L is not limited. Suitable linking groups L are for instance selected from —C(O)—, —CH$_2$—, =NCH$_2$—. Linking group L is typically a —C(O)— linking group and the fluoropolyether chain is bound to the carbon atom in the C-2 position via an amide bond.

In formula (II) T represents a fluoropolyether terminal group. Group T may be selected from the group consisting of —R', —COOR", —NCO, —COR''' wherein —R' is a C$_1$-C$_5$ fluoroalkyl, preferably a C$_1$-C$_5$ perfluoroalkyl; —R" is selected from —R' and —C(O)R'; and —R''' is selected from —H, —F, —Cl, —Br, and —R'.

Terminal group T may also be a poly-[1-4]-D-glucosamine chain bound to the fluoropolyether chain via a nitrogen atom in the C-2 position. That is, each fluoropolyether chain may be bound to one or more than one D-glucosamine recurring unit via the nitrogen atom in the C-2 position.

Should the fluoropolyether chain be bound to more than one D-glucosamine recurring unit said units may be in the same polymeric chain or in different polymeric chains. Typically, when bound to more than one D-glucosamine recurring unit, the fluoropolyether chains are bound to units in different polymeric chains providing a cross-linked network.

The term "cross-link" is used herein to refer to a covalent chemical bond bridging one polymer chain to another and the term "cross-linking" is used herein to refer to a process of chemically joining two or more polymer molecules by cross-links.

A fluoropolyether chain is bound to the nitrogen atom in the C-2 position of at least one D-glucosamine recurring unit in the poly-[1-4]-D-glucosamine derivative. Typically, a fluoropolyether chain is bound to the nitrogen atom in the C-2 position of at least 0.1 mol % of the D-glucosamine recurring units. Unless otherwise stated the molar percentages (mol %) are referred to the total number of moles of D-glucosamine units in the poly-[1-4]-D-glucosamine derivative.

Otherwise stated, glucosamine derivative [A] comprises at least 0.1 mol % of recurring units of formula (II) as defined above. Glucosamine derivative [A] comprises at least 0.1 mol %, preferably at least 0.2 mol %, more preferably at least 0.5 mol %, and even more preferably at least 1 mol % of recurring units of formula (II).

Typically the fluoropolyether chains are bound to the nitrogen atom in the C-2 position of at most 25 mol % of the D-glucosamine recurring units, preferably of at most 20 mol %, more preferably of at most 15 mol %, and even more preferably of at most 12 mol %.

The amount of recurring units of formula (Ia) in glucosamine derivative [A], is typically of at least 40 mol %, preferably of at least 50 mol %. Advantageously in formula (Ia) R is H.

Depending on the degree of deacetylation of the poly-[1-4]-D-glucosamine backbone, glucosamine derivative [A] may optionally comprise recurring units comprising acetylated —NHC(O)CH$_3$ groups in the C-2 position. Thus, glucosamine derivative [A] may comprise recurring units of formula (III):

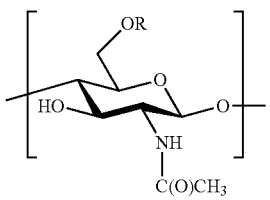

wherein R is as defined in formula (Ia).

Typically the amount of recurring units of formula (III) in glucosamine derivative [A] is at most 10 mol %, preferably at most 5 mol %. Recurring units of formula (III) may be absent.

In a first embodiment of the invention the glucosamine derivative, hereinafter referred to as glucosamine derivative [A-1], comprises, preferably consists of:
- at least 0.1 mol % and at most 25 mol % of recurring units of formula (II);
- at most 10 mol % of recurring units of formula (III); and
- recurring units of formula (Ia) in an amount complementary to 100 mol %.

More preferably glucosamine derivative [A-1] comprises, preferably consists of:
- at least 0.5 mol % and at most 12 mol % of recurring units of formula (II);
- at most 5 mol % of recurring units of formula (III); and
- recurring units of formula (Ia) in an amount complementary to 100 mol %.

In a preferred aspect of the embodiment glucosamine derivative [A-1] is a poly-[1-4]-β-D-glucosamine derivative.

In a further preferred aspect of the embodiment glucosamine derivative [A-1] contains recurring units of formula (Ia) wherein R=H.

Glucosamine derivative [A-1] according to this first embodiment has been found to be a solid insoluble in organic media and sparingly soluble in water/acetic acid solutions at a pH of about 4.

In view of its limited solubility glucosamine derivative [A-1] according to this first embodiment is particularly suitable for use protective coating, for instance in paper coating applications.

In a second embodiment, the glucosamine derivative of the invention, hereinafter referred to as glucosamine derivative [A-2], further comprises D-glucosamine recurring units wherein the carbon atom in the C-2 position is bound to a —NHC(O)CF$_3$ group and D-glucosamine recurring units wherein the carbon atom in the C-2 position is bound to a —NH$_3^+$(CF$_3$COO$^-$) group, that is recurring units of formula (IVa) and (IVb):

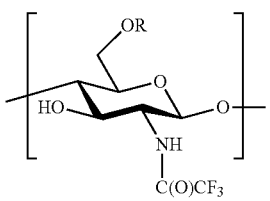

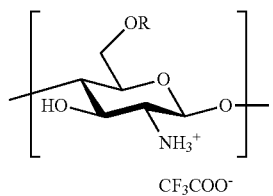

wherein R is as defined in formula (Ia).

Recurring units of formula (IVa) and (IVb) are typically in a 1:1 ratio. The ratio (recurring units of formula (IVa))/(recurring units of formula (IVb)) may range from 0.8:1 to 1.2:1.

The combined amount of recurring units of formula (IVa) and (IVb) in the glucosamine derivative [A-2] is generally of at least 20 mol %, preferably of at least 25 mol %. The combined amount of recurring units of formula (IVa) and (IVb) in the glucosamine derivative [A-2] is generally of at most 60 mol %, preferably of at most 50 mol %.

In glucosamine derivative [A-2] the amount of recurring units of formula (II) as defined above, that is of recurring units comprising a fluoropolyether chain bound to the nitrogen atom in the C-2 position of the D-glucosamine recurring units, is of at least 0.1 mol %, even at least 0.2 mol %. Generally the amount of recurring units of formula (II) in glucosamine derivative [A-2] is at most 12 mol %, even at most 10 mol %.

In glucosamine derivative [A-2] the amount of recurring units of formula (Ia) as defined above, is typically of at least 15 mol %, preferably of at least 20 mol %. The amount of recurring units of formula (Ia) in glucosamine derivative [A-2] is generally of at most 70 mol %.

Preferably glucosamine derivative [A-2] of the second embodiment comprises, preferably consists of:
- at least 0.1 mol % and at most 12 mol % of recurring units of formula (II);
- at least 20 mol % of the combined amount of recurring units of formulae (IVa) and (IVb) in a (IVa):(IVb) ratio from 0.8:1 to 1.2:1;
- at most 10 mol % of recurring units of formula (III); and
- recurring units of formula (Ia) in an amount complementary to 100 mol %.

More preferably glucosamine derivative [A-2] comprises, preferably consists of:
- at least 0.1 mol % and at most 10 mol % of recurring units of formula (II);
- at least 20 mol % and at most 50 mol % of the combined amount of recurring units of formulae (IVa) and (IVb) in a (IVa):(IVb) ratio from 0.8:1 to 1.2:1;
- at most 5 mol % of recurring units of formula (III); and
- recurring units of formula (Ia) in an amount complementary to 100 mol %.

In a preferred aspect of this second embodiment the poly-[1-4]-D-glucosamine derivative is a poly-[1-4]-β-D-glucosamine derivative.

Glucosamine derivatives [A-2] according to this second embodiment of the invention have been found to be particularly advantageous as starting materials for the preparation of other compounds, as they are soluble in aqueous media. For instance a poly-[1-4]-β-D-glucosamine derivative comprising from 2 to 6 mol % of recurring units of formula (II) comprising fluoropolyether chains FPE having a number average molecular weight of 1,500 g/mol; from 55 to 65 mol % of recurring units of formula (Ia) wherein R=H; and from 29 to 43 mol % of the combined amount of recurring units of formula (IVa) and (IVb) in a 0.8:1 to 1.2:1 ratio has been found to have a solubility in water at room temperature of about 5.8 wt %.

Additionally it has been found that films made with glucosamine derivatives [A-2] wherein the poly-[1-4]-D-glucosamine derivative is a poly-[1-4]-β-D-glucosamine can polarize an incident light, making them highly suitable for the preparation of screens and lenses for optical devices.

In a third embodiment, the glucosamine derivative of the invention, hereinafter referred to as glucosamine derivative [A-3], further comprises recurring units of formula (V):

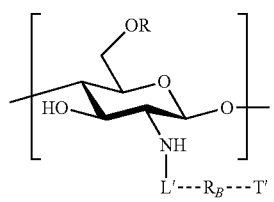

wherein $R_B$ is a $C_1$-$C_{20}$ alkylene group, optionally fluorinated, optionally comprising cyclic or aromatic moieties, optionally comprising heteroatoms in the alkylene chain, optionally comprising functional groups; L' indicates a linking group between the alkylene group $R_B$ and the nitrogen atom in the C-2 position in the D-glucosamine unit and T' indicates a terminal group.

Alkylene group $R_B$ may be a linear alkylene chain of formula —$(CH_2)_n$—, wherein n is an integer selected from 4, 6, 8, 10 and 12, preferably n=6, 8. Alkylene group $R_B$ may advantageously comprise aromatic and cycloaliphatic moieties. Non limiting examples of suitable aromatic and cycloaliphatic groups $R_B$ are those selected from the group consisting of formulae $R_B1$ to $R_B4$ below:

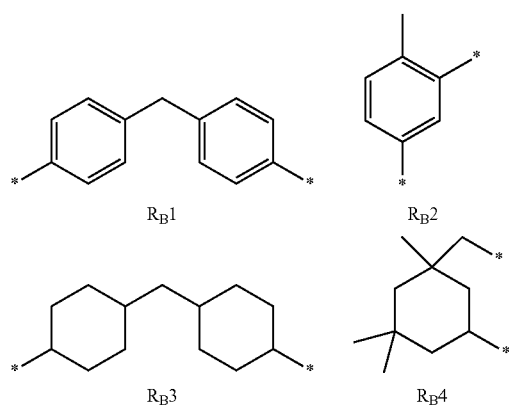

wherein the asterisk (*) indicates the carbon atoms bound to linking group L' and terminal group T'. Preferably alkylene group $R_B$ is selected from —$(CH_2)_6$— or $R_B3$.

The nature of the linking group L' is not limited. Linking group L' is typically a —C(O)— or a —C(O)—NH— linking group and the alkylene group $R_B$ is bound to the carbon atom in the C-2 position via an amide or an urethane bond.

In formula (V) T' represents a terminal group. Group T' may be selected from the group consisting of —R', —COOR″, —NCO, —COR‴ wherein —R' is a $C_1$-$C_5$ alkyl, optionally fluorinated, —R″ is selected from —R', —C(O)R' and —R‴ is selected from —H, —F, —Cl, —Br, and —R'. Preferably group T' is an isocyanate group —NCO.

Terminal group T' may also be a poly-[1-4]-D-glucosamine chain bound to the alkylene group $R_B$ via a nitrogen atom in the C-2 position. That is, each alkylene group $R_B$ may be bound to one or more than one D-glucosamine recurring unit via the nitrogen atom in the C-2 position.

Should the alkylene group $R_B$ be bound to more than one D-glucosamine recurring unit said units may be in the same polymeric chain or in different polymeric chains. Typically, when bound to more than one D-glucosamine recurring units, the alkylene group $R_B$ is bound to units in different polymeric chains providing a cross-linked network.

Glucosamine derivative [A-3] typically comprises at least 0.1 mol % of recurring units of formula (V), preferably at least 0.2 mol %, more preferably at least 0.5 mol %. Typically the amount of recurring units of formula (V) in glucosamine derivative [A-3] is at most 20 mol %, preferably at most 15 mol %, more preferably at most 10 mol %.

In a typical composition glucosamine derivative [A-3] comprises, preferably consists of:
  at least 0.1 mol % and at most 12 mol % of recurring units of formula (II);
  at least 20 mol % and at most 50 mol % of the combined amount of recurring units of formulae (IVa) and (IVb) in a (IVa):(IVb) ratio from 0.8:1 to 1.2:1;
  at least 0.1 mol % and at most 20 mol % of recurring units of formula (V);
  at most 5 mol % of recurring units of formula (III); and
  recurring units of formula (Ia) in an amount complementary to 100 mol %.

Preferably glucosamine derivative [A-3] comprises, preferably consists of:
  at least 0.1 mol % and at most 10 mol % of recurring units of formula (II);
  at least 20 mol % and at most 50 mol % of the combined amount of recurring units of formulae (IVa) and (IVb) in a (IVa):(IVb) ratio from 0.8:1 to 1.2:1;
  at least 0.2 mol % and at most 10 mol % of recurring units of formula (V);
  at most 5 mol % of recurring units of formula (III); and
  recurring units of formula (Ia) wherein R=H in an amount complementary to 100 mol %.

In a fourth embodiment of the glucosamine derivative of the invention, hereinafter referred to as glucosamine derivative [A-4], at least 1 mol % of the total groups R in the 0-6 position of the recurring units of formulae (Ia) to (IVa)/(IVb) is selected from the group consisting of $C_1$-$C_{20}$ alkyls, optionally comprising cyclic or aromatic moieties, optionally comprising heteroatoms in the alkyl chain, and/or optionally comprising functional groups. Preferably R is selected from the group consisting of $C_4$-$C_{12}$ alkyls optionally comprising cyclic or aromatic moieties, optionally comprising heteroatoms in the alkyl chain, and/or optionally comprising functional groups. More preferably R is selected from the group consisting of $C_4$-$C_{10}$ alkyls comprising functional groups. Suitable functional groups are those selected from the group consisting of aldehyde, ketone and carboxy functional groups. In an advantageous aspect of this fourth embodiment group R is —C(O)—$(CH_2)_2$CHO.

Glucosamine derivatives [A-3] and [A-4] have been found to be particularly suitable for the preparation of solvent-resistant coatings. The coatings may be conveniently prepared by casting of the glucosamine derivatives from a liquid composition. Also the coatings comprising glucosamine derivatives [A-3] and [A-4] can polarize an incident light, making them highly suitable for the preparation of screens and lenses for optical devices.

A further object of the present invention is a process for the preparation of the poly-[1-4]-D-glucosamine derivatives of the invention.

The process comprises the steps of:
a) providing a dispersion in a liquid medium of a poly-[1-4]-D-glucosamine compound comprising D-glucosamine recurring units having an amino group in the C-2 position;
b) reacting said poly-[1-4]-D-glucosamine compound with a fluoropolyether comprising at least one functional group capable to react with the amino group in the C-2 position.

The poly-[1-4]-D-glucosamine compound typically has a number average molecular weight ($M_n$) of at least 5,000, preferably of at least 8,000, more preferably of at least 10,000 g/mol.

The number average molecular weight of the poly-[1-4]-D-glucosamine compound typically does not exceed 150,000, preferably it does not exceed 100,000, more preferably it does not exceed 80,000, and even more preferably it does not exceed 50,000 g/mol. The poly-[1-4]-D-glucosamine compound preferably has a number average molecular weight ($M_n$) of at least 10,000 and of at most 50,000 g/mol.

The poly-[1-4]-D-glucosamine compound may contain residual acetamide —NHC(O)CH$_3$ groups in the C-2 position. Typically the amount of residual acetamide groups does not exceed 25 mol %, preferably it does not exceed 20 mol %, more preferably it does not exceed 10 mol % and even more preferably it does not exceed 5 mol % of all the C-2 positions in the poly-[1-4]-D-glucosamine compound.

The poly-[1-4]-D-glucosamine compound is preferably poly-[1-4]-β-D-glucosamine.

The fluoropolyether suitable for the process comprises at least one functional group that can react with an amino group. Preferably, the fluoropolyether comprises at least one functional group that can react with an amino group to form covalent bonds. Non limiting examples of functional groups that can react with amino groups forming covalent bonds are carboxy group, isocyanate groups, aldehyde groups and ketone groups. Preferably the functional group is a carboxy group. For the purpose of the invention the expression "carboxy group" is meant to comprise carboxylic acid groups and derivatives thereof like salts, halides, esters and anhydrides.

The fluoropolyether comprises at least one functional group capable to react with amino groups. The fluoropolyether may comprise one functional group capable to react with amino groups, two functional groups, three functional groups and up to any number of functional groups. Typically the fluoropolyether does not comprise more than 10 functional groups capable to react with amino groups, generally not more than 5 functional groups.

In an embodiment the fluoropolyether comprises one functional group capable to react with amino groups, preferably a carboxy group.

In another embodiment the fluoropolyether contains two functional groups capable to react with amino groups, preferably carboxy groups.

The at least one functional group is preferably a terminal group.

Non limiting examples of suitable fluoropolyethers comprising at least one functional group that can react with amino groups can be represented by formula (VI) below:

Y—O—FPE-Y$^1$ (VI)

wherein:
FPE represents a fluoropolyoxyalkylene chain as defined above for glucosamine derivative [A];
Y is selected from: —CFX$^2$C(O)R$_h$, —CFX$^2$C(O)OR$_h$, wherein X$^2$ is —F or —CF$_3$, and R$_h$ is selected from —H and a C$_1$-C$_{10}$ linear or branched alkyl group,
Y$^1$ is the same as Y or is selected from —CF$_3$, —CF$_2$Cl, —CF$_2$CF$_2$Cl, —C$_3$F$_6$Cl, —CF$_2$Br, —CF$_2$CF$_3$, —CF$_2$H, —CF$_2$CF$_2$H.
Typically Y$^1$=Y.

Fluoropolyethers having functional groups capable to react with amino groups are for instance known from EP 148482 A (DAIKIN INDUSTRIES) 17 Jul. 1985.

Fluoropolyethers having functional groups capable to react with amino groups are also commercially available from Solvay Specialty Polymers Italy SpA, for instance as Fluorolink® L 10/H.

In a first step of the process the poly-[1-4]-D-glucosamine polymer comprising amino groups in the C-2 position of the [1-4]-D-glucosamine recurring units is dispersed in a liquid medium.

The term "dispersed" is hereby intended to denote a suspension of the poly-[1-4]-D-glucosamine polymer.

The liquid medium is typically an organic liquid medium, water may be optionally present. Preferably the organic liquid medium is selected from the group of aprotic organic solvents. Non limiting examples of suitable aprotic organic solvents are toluene, ketones, like acetone, methylethylketone, esters, like methylacetate, dimethylcarbonate, diethylcarbonate, ethylacetate, nitriles, like acetonitrile, sulphoxides, like dimethylsulfoxide, amides, like N,N-dimethylformamide, N,N-dimethylacetamide, pyrrolidones, like N-methylpyrrolidone, N-ethylpyrrolidone.

A fluoropolyether having at least one functional group capable to react with amino groups is added to the dispersion of the poly-[1-4]-D-glucosamine and allowed to react.

In general the amount of fluoropolyether having at least one functional group capable to react with amino groups added to the dispersion of the poly-[1-4]-D-glucosamine is calculated on the basis of the numbers of functional groups in the fluoropolyether per number of amino groups in the poly-[1-4]-D-glucosamine. In general the amount of fluoropolyether added contains a number of functional groups which is at least 10%, preferably at least 20%, more preferably at least 30% of the number of amino groups in the poly-[1-4]-D-glucosamine. The amount of fluoropolyether added contains a number of functional groups which can be greater than 100% of the number of amino groups in the poly-[1-4]-D-glucosamine. Generally, however the amount of fluoropolyether added contains a number of functional groups which is up to 100% of the number of amino groups in the poly-[1-4]-D-glucosamine, preferably up to 80%, more preferably up to 70%.

The reaction is generally carried out at a temperature of at least 50° C., preferably of at least 70° C. Generally the reaction is carried out at a temperature not exceeding 200° C., preferably not exceeding 180° C.

The reaction time can be adjusted depending on the course of the reaction which can be monitored according to methods known to the person skilled in the art. In general the reaction time may range from 1 to 20 hours.

At the end of the reaction a poly-[1-4]-D-glucosamine derivative comprising fluoropolyether chains bound to the nitrogen atom in the C-2 position of at least a fraction of the [1-4]-D-glucosamine recurring units in the chain is obtained.

In an embodiment of the process, the process further comprises the step of:
c) reacting a portion of the amino groups in the C-2 position of the [1-4]-D-glucosamine recurring units with trifluoroacetic anhydride.

Step c) may be carried out before or after step b).

Advantageously step c) is carried out before step b). The poly-[1-4]-D-glucosamine compound which is obtained from the process after step a) and step c) have been completed can be isolated, using standard procedures, and reacted with a fluoropolyether comprising at least one functional group capable to react with the amino group in a second separate stage of the process.

The poly-[1-4]-D-glucosamine derivative which is obtained from the process after step a) and step c) have been completed, hereinafter defined as glucosamine derivative [B-1], is characterised by the fact that a portion of the amino groups in the C-2 position have reacted with trifluoroacetic anhydride providing —NHC(O)CF$_3$ and —NH$_3^+$(CF$_3$COO$^-$) groups in roughly a 1:1 ratio. The ratio —NHC(O)CF$_3$/—NH$_3^+$(CF$_3$COO$^-$) may range from 0.8:1 to 1.2:1.

Thus, glucosamine derivative [B-1] comprises recurring units of formula (Ia), optionally recurring units of formula (III) and recurring units of formulae (IVa) and (IVb) as defined above.

Typically glucosamine derivative [B-1] comprises:
at least 20 mol % and at most 60 mol % of the combined amount of recurring units of formulae (IVa) and (IVb) in a (IVa):(IVb) ratio from 0.8:1 to 1.2:1;
at most 10 mol % of recurring units of formula (III); and
recurring units of formula (Ia) in an amount complementary to 100 mol %.

Glucosamine derivative [B-1] has been found to be soluble in water. For instance a poly-[1-4]-β-D-glucosamine derivative comprising from 25 to 45 mol % of recurring units of formula (Ia) wherein R═H and from 55 to 75 mol % of combined recurring units of formulae (IVa) and (IVb) in a 0.8:1 to 1.2:1 ratio and at most 5 mol % of recurring units of formula (III) has been found to have a solubility in water at room temperature of about 15.6 wt %.

When step c) of the process is carried out before step b) the amount of trifluoroacetic anhydride which is reacted with poly-[1-4]-D-glucosamine is less than the amount required to convert all of the amino groups into groups —NHC(O)CF$_3$ and —NH$_3^+$(CF$_3$COO$^-$). Typically the amount of amino groups which are converted into —NHC(O)CF$_3$ and —NH$_3^+$(CF$_3$COO$^-$) groups is more than 40%, preferably more than 50% with respect to the total amount of amino groups in the polymer. The amount of amino groups which are converted into —NHC(O)CF$_3$ and —NH$_3^+$(CF$_3$COO$^-$) groups is generally less than 85%, preferably less than 75% with respect to the total amount of amino groups in the polymer.

Step c) is typically carried out at a temperature of at least 25° C. and of at most 100° C.

Thus, in a preferred embodiment the process comprises the steps of:
a) providing a dispersion in a liquid medium of a poly-[1-4]-D-glucosamine polymer comprising D-glucosamine recurring units having an amino group in the C-2 position;
c) reacting a portion of the amino groups in the C-2 position of the D-glucosamine recurring units with trifluoroacetic anhydride; and
b) reacting the poly-[1-4]-D-glucosamine compound obtained from step c) with a fluoropolyether comprising at least one functional group capable to react with the amino group in the C-2 position.

At the end of the process the poly-[1-4]-D-glucosamine derivative can be isolated and purified according to methods and techniques known in the art. Glucosamine derivative [A-2] as defined above is typically obtained at the end of this embodiment of the process.

The process thus comprises the additional step of:
d) separating the poly-[1-4]-D-glucosamine derivative obtained after step b) from the liquid medium.

In another embodiment the process further comprises the step of:
e) reacting a portion of the amino groups in the C-2 position of the D-glucosamine recurring units with a compound of formula (VII) Z$^1$—R$_B$—Z$^2$, wherein R$_B$ has the meaning as defined for glucosamine derivative [A-3], and Z$^1$ and Z$^2$ are each independently selected from the group consisting of —COOR″, —COR‴, —NCO, —NHC(O)SO$_3$Na in which R″ and —R‴ are as defined.

Preferably Z$^1$ and Z$^2$ are the same and are selected from the group consisting of —NCO and —NHC(O)SO$_3$Na.

In an advantageous embodiment of the process comprising steps a), b), c) and e) Z$^1$ and Z$^2$ are both —NHC(O)SO$_3$Na. In this embodiment the reaction between the poly-[1-4]-D-glucosamine derivative obtained after carrying out steps a), b) and c), that is glucosamine derivative [A-2], and Z$^1$—R$_B$—Z$^2$, can be conveniently carried out in water, typically at a pH of at least 7. The reaction is generally initiated by raising the temperature to a temperature of at least 50° C., preferably of at least 60° C. This step of the process may conveniently be carried out in a second stage, for instance after forming a coating of the aqueous composition comprising glucosamine derivative [A-2] and Z$^1$—R$_B$—Z$^2$ on a support.

Typically step e) is carried out after step b), preferably after steps c) and b).

At any stage of the process the poly-[1-4]-D-glucosamine derivative may be reacted with a compound of formula R-Q to obtain a glucosamine derivative [A-5]. In compound of formula R-Q, R is as defined above in the definition of formula (Ia) and Q is a functional group capable to react with the —OH group in the C-6 position. Preferably step f) of reacting the poly-[1-4]-D-glucosamine derivative with a compound of formula R-Q is carried out as an alternative to step e) of the process as defined above. Step f) is typically carried out at a temperature of at least 15° C. and of at most 50° C.

An additional object of the invention is a composition comprising the glucosamine derivative according to any embodiment of the invention.

Of interest are compositions comprising at least one glucosamine derivative selected from the group consisting of glucosamine derivative [A-1], glucosamine derivative [A-2], glucosamine derivative [A-3], glucosamine derivative [A-4] and glucosamine derivative [B-1] and a liquid medium. Of particular interest are compositions comprising at least one glucosamine derivative selected from the group consisting of glucosamine derivative [A-1], glucosamine derivative [A-2], glucosamine derivative [A-3], glucosamine derivative [A-4] and a liquid medium.

The liquid medium may be selected from water or from the group of organic solvents as already defined.

The compositions can be conveniently used for the preparation of films and coatings comprising the glucosamine derivatives identified above.

Films and coatings comprising the glucosamine derivatives of the invention are hydrophobic and provided with the barrier properties which are typical of poly-[1-4]-D-glucosamine polymers and they are capable to polarize incident light.

The inventive compositions may be additionally employed for the treatment of fibers, such as natural fibers, to provide anti-stain characteristics.

The glucosamine derivatives of the invention, in particular derivatives according to may also find use as surface active agents.

It is understood that all preferences defined for the glucosamine derivatives of the invention equally apply to the poly-[1-4]-D-glucosamine compound and the fluoropolyether used in the process as well as to the compositions and articles comprising the glucosamine derivatives of the invention.

The invention will be now described in more detail with reference to the following examples, whose purpose is merely illustrative and not intended to limit the scope of the invention.

Materials

Chitosan (Medium molecular weight chitosan commercially available from Sigma Aldrich®): $M_n$=25,167 g/mol; degree of deacetylation 85%; 3.1 meq C2-$NH_2$/g chitosan.

[FPE dimethyl ester]: Fluoropolyether having generic formula $H_3CO(O)CCF_2O(CF_2CF_2O)_b(CF_2O)_aCF_2C(O)OCH_3$, a number average molecular weight of 1,500 g/mol and a ratio b/a=1.9 available from Solvay Specialty Polymers Italy SpA

EXAMPLES

Synthesis of Glucosamine Derivative [A-1]

In a round-bottom glass reactor, 0.5 grams of chitosan were dispersed in 10 ml of dimethylacetamide. To this dispersion 0.93 grams (0.62 mmols) of [FPE dimethyl ester] were added and the solution heated to 130° C. and kept at 130° C. under vigorous stirring for 10 hours. At the end of the reaction time a homogeneous solution was obtained. The solution was poured in 200 ml of distilled water at 10° C. A precipitate was obtained which was isolated by centrifugation. The solid was washed in ethanol, followed by washing in water, before isolating the solid by centrifugation. The light brown crystalline solid (33 mol % yield) was dried at 60° C. and 15 mmHg residual pressure for 3 hours. The isolated glucosamine derivative [A-1] contained 10 mol % of recurring units comprising a FPE chain (48% w/w) and had an average molecular weight of 28,313 g/mol.

FT-IR (Golden gate): confirmed the presence of bound FPE chains (band at 1735 cm$^{-1}$, assigned to —NHC(O)$CF_2$—FPE stretching).

Synthesis of Glucosamine Derivative [B-1]

In a round-bottom flask reactor 2.0 g of chitosan (12.4 meq —$NH_2$) were suspended in 10 ml of toluene and the heterogeneous solution was heated to 65° C.; then 1.39 g (13.2 meq) of trifluoroacetic anhydride dissolved in 5 ml of toluene were added. The suspension was allowed to react under stirring at 65° C. for 2.5 hrs and 8 hrs at room temperature. The heterogeneous crude mixture was filtered on a PTFE 5 µm membrane filter and dried at 60° C. and reduced pressure for 4 hrs. A tan powder was obtained (yield 94.8 mol %) which was characterised as containing 30 mol % of recurring units containing —$NH_2$ groups (recurring units of formula (I)); and 70 mol % of combined trifluoro acetic amide/trifluoroacetic ammonium groups in the C-2 position in a 57:43 ratio. Glucosamine derivative [B-1] thus obtained had a water solubility of 14.57 wt %, and an average molecular weight ($M_n$) of 25,344 g/mol. TGA analysis showed that the compound is stable up to a temperature of 150° C.

FT-IR analysis (Golden gate) 1670 cm$^{-1}$, 1650 cm$^{-1}$ ($CF_3$ amide, ammonium).

Synthesis of Glucosamine Derivative [A-2]

2.52 g of glucosamine derivative [B-1] previously prepared containing 64 mol % of recurring units containing —$NH_2$ groups were added to a stable suspension composed of 3.72 g [FPE dimetyl ester] (2.48 mmoles), 20 ml in a DMA/ethanol mixture and stirred at 900 rpm in a glass round-bottom reactor at 60° C. for 8 hrs. The low-boiling solvents were evaporated at 60° C. under reduced pressure. The solid residue was washed with 20 ml $ClCF_2CFCl_2$ and the solution filtered on a PTFE 5 µm membrane. The pale yellow solid was dried at 60° C. for 2 hrs (yield 62 mol %). The glucosamine derivative [A-2] thus obtained was characterised as follows: 36 mol % of recurring units comprising a —$CF_3$ group (units of formula (IVa)/(IVb)); 4 mol % of recurring units comprising a FPE chain (37 wt %) (units of formula (II)); 60 mol % of recurring units containing —$NH_2$ groups (units of formula (I)); average molecular weight ($M_n$) 25,379 g/mol; solubility in water: 5.82 wt %; stable up to 160° C. (TGA determination).

FT-IR (Golden gate): 1735 cm$^{-1}$ —NHC(O)$CF_2$—FPE; 1670 cm$^{-1}$, 1650 cm$^{-1}$ (—$CF_3$ amide, ammonium); 1100 cm$^{-1}$ —CF— st. FPE.

$^{19}$F-NMR (ppm): −55 (—$OCF_2O$— FPE units; −75 $CF_3$—; −80, −82 FPE-$OCF_2C$(=O)—; −91 (—$OCF_2CF_2O$— PFPE units).

A film of glucosamine derivative [A-2] (47 µm thickness) was obtained by casting from a liquid composition in water.

The contact angle (static mode) of the film of glucosamine derivatives [A-2] and [B-1] was determined vs. water and a hydrocarbon solvent ($C_{16}H_{34}$) to verify the effect of the bound fluoropolyether chains on the surface properties of chitosan. The results reported in Table 1 show that while both films are hydrophobic, the film comprising glucosamine derivative [A-2] is less oleophobic than that comprising glucosamine derivative [B-1].

TABLE 1

| | Water ($\theta_M$) | $C_{16}H_{34}$ ($\theta_M$) |
|---|---|---|
| Glucosamine derivative [A-2] | 99 | 71 |
| Glucosamine derivative [B-1] | 107 | 22 |

Synthesis of Glucosamine Derivative [A-3]

Glucosamine derivative [A-2] (0.500 g; 1.597 meq) was suspended in 4 ml of anhydrous toluene and vigorously stirred. To the heterogeneous solution 80 µl of compound OCN—$(C_6H_{10})$—$CH_2$—$(C_6H_{10})$—NCO ($R_B$=$R_B$3; 0.319 mmols, 0.638 meq —NCO units) were added with a microsyringe. The heterogeneous mixture was heated to 60° C. and reacted for 8 hrs. The crude mixture was centrifuged at 4000 rpms at 15° C. for 20 mins. The solid was washed with anhydrous toluene. The washed solid was suspended in 5 ml of $CH_2Cl_2$ and evaporated under reduced pressure at 60° C. A fine powdery solid was obtained (yield 57 wt %). The solubility in water of glucosamine derivative [A-3] was 0.198 wt % and the derivative was found to be thermally stable up to 200° C. (TGA).

FT-IR (golden-gate): 1740 cm$^{-1}$, 1209 cm$^{-1}$ (FPE-C(O)—NH—C2-Chitosan); 2929 cm$^{-1}$, 2847 cm$^{-1}$, (polyurea cyclohexane rings); 1569 cm$^{-1}$ (—C(O)— polyurea carbonyls); 1690 cm$^{-1}$ (CF$_3$C(O)—NH—C2-chitosan); 1629 cm$^{-1}$ (CF$_3$CO2$^{(-)(+)}$H$_3$N—C2-Chitosan).

Synthesis of Glucosamine Derivative [A-4]

Glucosamine derivative [A-2] (200 mg) was dissolved in 10 ml of distilled water at room temperature. The solution was slowly poured in a Petri dish. Glutaraldehyde, 5 g of a 2.5% w/w (2.5 meq.) solution in water and 10 μl of CH$_3$COOH were added to the Petri dish thoroughly mixing the reagents. Once mixing was complete, the solution was heated to 60° C. for 21 hrs with 750 rpm stirring. At the end of the reaction time a water-insoluble film was formed which was washed with distilled water. The film was dried at 60° C. and reduced pressure for 3 hrs. Yield 58% w/w; TGA: thermally stable up to 200° C. FT-IR (Golden-gate) 2948 cm$^{-1}$, 1868 cm$^{-1}$ (CH st.-glutaraldehyde aliphatic chain).

The invention claimed is:

1. A poly-[1-4]-D-glucosamine derivative which comprises at least 0.1 mol % and at most 25 mol % of recurring units of formula (II); at most 10 mol % of recurring units of formula (III); and recurring units of formula (Ia) such that the total amount of recurring units in the poly-[1-4]-D-glucosamine derivative equals 100 mol %

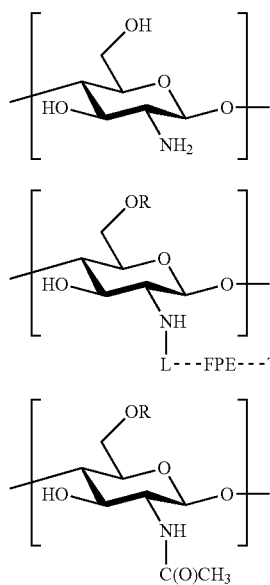

wherein in formulas (Ia), (II) and (III) R is —H or a C$_1$-C$_{20}$ alkyl group, optionally comprising cyclic or aromatic moieties, optionally comprising heteroatoms in the alkyl chain, and/or optionally comprising functional groups; and wherein in formula (II) FPE indicates a fluoropolyether chain; L indicates a linking group between the fluoropolyether chain and the nitrogen atom in the C-2 position in the D-glucosamine unit and T a terminal group.

2. The poly-[1-4]-D-glucosamine derivative according to claim 1 which comprises at least 0.1 mol % and at most 10 mol % of recurring units of formula (II); at least 20 mol % and at most 50 mol % of the combined amount of recurring units of formulae (IVa) and (IVb) in a (IVa):(IVb) ratio from 0.8:1 to 1.2:1; at most 5 mol % of recurring units of formula (III); and recurring units of formula (Ia) such that the total amount of recurring units in the poly-[1-4]-D-glucosamine derivative equals 100 mol %

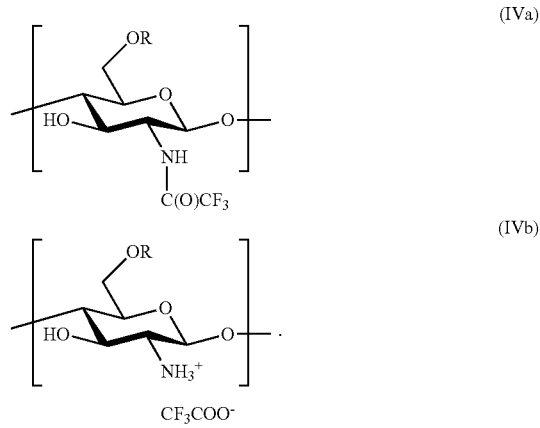

3. The poly-[1-4]-D-glucosamine derivative according to claim 2 which comprises at least 0.1 mol % and at most 10 mol % of recurring units of formula (II); at least 20 mol % and at most 50 mol % of the combined amount of recurring units of formulae (IVa) and (IVb) in a (IVa):(IVb) ratio from 0.8:1 to 1.2:1; at least 0.2 mol % and at most 10 mol % of recurring units of formula (V); at most 5 mol % of recurring units of formula (III); and recurring units of formula (Ia) such that the total amount of recurring units in the poly-[1-4]-D-glucosamine derivative equals 100 mol %

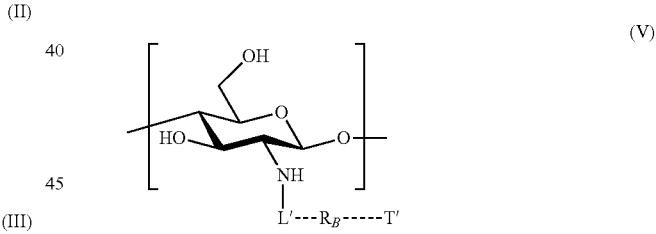

wherein in formula (V) R$_B$ is a C$_1$-C$_{20}$ alkylene group, optionally fluorinated, optionally comprising cyclic or aromatic moieties, optionally comprising heteroatoms in the alkylene chain; L' indicates a linking group between the alkylene group R$_B$ and the nitrogen atom in the C-2 position in the D-glucosamine unit and T' indicates a terminal group.

4. The poly-[1-4]-D-glucosamine derivative according to claim 1, wherein the fluoropolyether chain comprises one or more randomly distributed recurring units selected from the group consisting of:
(i) —CFXO—, wherein X is —F or —CF$_3$;
(ii) —CF$_2$CFXO—, wherein X is —F or —CF$_3$;
(iii) —CF$_2$CF$_2$CF$_2$O—;
(iv) —CF$_2$CF$_2$CF$_2$CF$_2$O—; and
(vi) —(CF$_2$)$_k$—CFZ—O—, wherein k is an integer from 0 to 3 and Z is a group of general formula —OR$_F$T$_1$, wherein R$_F$ is a fluoropolyoxyalkylene chain comprising a number of recurring units from 0 to 10, said recurring units being selected from: —CFXO—, —CF$_2$CFXO—, —CF$_2$CF$_2$CF$_2$O—, and —CF$_2$CF$_2$CF$_2$CF$_2$O—, with each of X being independently —F or —CF$_3$, and T$_1$ is a C$_1$-C$_5$ perfluoroalkyl group.

5. The poly-[1-4]-D-glucosamine derivative according to claim 1, wherein the glucosamine recurring units are β-D-glucosamine units.

6. A process for the preparation of the poly-[1-4]-D-glucosamine derivative of claim 1, the process comprising:
a) providing a dispersion in a liquid medium of a poly-[1-4]-D-glucosamine compound comprising D-glucosamine recurring units having an amino group in the C-2 position;
b) reacting said poly-[1-4]-D-glucosamine compound with a fluoropolyether comprising at least one functional group capable to react with the amino group in the C-2 position.

7. The process according to claim 6 further comprising reacting a portion of the amino groups in the C-2 position of the D-glucosamine recurring units with trifluoroacetic anhydride.

8. The process according to claim 7, wherein reacting with trifluoroacetic anhydride is carried out before reacting with a fluoropolyether.

9. The process according to claim 7, comprising reacting a portion of the amino groups in the C-2 position of the D-glucosamine recurring units with a compound of formula Z$^1$—R$_B$—Z$^2$, wherein R$_B$ is a C$_1$-C$_{20}$ alkylene group, optionally fluorinated, optionally comprising cyclic or aromatic moieties, optionally comprising heteroatoms in the alkylene chain and Z$^1$ and Z$^2$ are each independently selected from the group consisting of —NCO and —NHC(O)SO$_3$Na.

10. The process according to claim 6, further comprising reacting the poly-[1-4]-D-glucosamine derivative with a compound of formula R-Q wherein R is a C$_1$-C$_{20}$ alkyl group, optionally comprising cyclic or aromatic moieties, optionally comprising heteroatoms in the alkyl chain, and/or optionally comprising functional groups, and Q is a functional group capable to react with the —OH group in the C-6 position of the D-glucosamine recurring units.

11. A composition comprising the poly-[1-4]-D-glucosamine derivative of claim 1.

12. A composition comprising the poly-[1-4]-D-glucosamine derivative of claim 1 and a liquid medium.

13. An article comprising the poly-[1-4]-D-glucosamine derivative of claim 1.

14. A film, coating or fiber comprising the poly-[1-4]-D-glucosamine derivative of claim 1.

15. The poly-[1-4]-D-glucosamine derivative according to claim 2, wherein the fluoropolyether chain comprises one or more randomly distributed recurring units selected from the group consisting of:
(i) —CFXO—, wherein X is —F or —CF$_3$;
(ii) —CF$_2$CFXO—, wherein X is —F or —CF$_3$;
(iii) —CF$_2$CF$_2$CF$_2$O—;
(iv) —CF$_2$CF$_2$CF$_2$CF$_2$O—; and
(vi) —(CF$_2$)$_k$—CFZ—O—, wherein k is an integer from 0 to 3 and Z is a group of general formula —OR$_F$T$_1$, wherein R$_F$ is a fluoropolyoxyalkylene chain comprising a number of recurring units from 0 to 10, said recurring units being selected from: —CFXO—, —CF$_2$CFXO—, —CF$_2$CF$_2$CF$_2$O—, and —CF$_2$CF$_2$CF$_2$CF$_2$O—, with each of X being independently —F or —CF$_3$, and T$_1$ is a C$_1$-C$_5$ perfluoroalkyl group.

16. The poly-[1-4]-D-glucosamine derivative according to claim 3, wherein the fluoropolyether chain comprises one or more randomly distributed recurring units selected from the group consisting of:
(i) —CFXO—, wherein X is —F or —CF$_3$;
(ii) —CF$_2$CFXO—, wherein X is —F or —CF$_3$;
(iii) —CF$_2$CF$_2$CF$_2$O—;
(iv) —CF$_2$CF$_2$CF$_2$CF$_2$O—; and
(vi) —(CF$_2$)$_k$—CFZ—O—, wherein k is an integer from 0 to 3 and Z is a group of general formula —OR$_F$T$_1$, wherein R$_F$ is a fluoropolyoxyalkylene chain comprising a number of recurring units from 0 to 10, said recurring units being selected from: —CFXO—, —CF$_2$CFXO—, —CF$_2$CF$_2$CF$_2$O—, and —CF$_2$CF$_2$CF$_2$CF$_2$O—, with each of X being independently —F or —CF$_3$, and T$_1$ is a C$_1$-C$_5$ perfluoroalkyl group.

17. The poly-[1-4]-D-glucosamine derivative according to claim 16, wherein the glucosamine recurring units are β-D-glucosamine units.

18. A composition comprising the poly-[1-4]-D-glucosamine derivative of claim 17 and a liquid medium.

19. An article comprising the poly-[1-4]-D-glucosamine derivative of claim 17.

20. A film, coating or fiber comprising the poly-[1-4]-D-glucosamine derivative of claim 17.

\* \* \* \* \*